United States Patent
Henwood et al.

(10) Patent No.: US 9,261,070 B2
(45) Date of Patent: Feb. 16, 2016

(54) METHOD OF CONTROLLING A DEVICE FOR CONVERTING WAVE ENERGY TO ELECTRICAL ENERGY

(75) Inventors: Nicolas Henwood, Paris (FR); Jérémy Malaize, Neuchâtel (CH); Jonathan Chauvin, Paris (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 14/008,153

(22) PCT Filed: Mar. 27, 2012

(86) PCT No.: PCT/FR2012/000107
§ 371 (c)(1),
(2), (4) Date: Dec. 12, 2013

(87) PCT Pub. No.: WO2012/131186
PCT Pub. Date: Oct. 4, 2012

(65) Prior Publication Data
US 2014/0084586 A1    Mar. 27, 2014

(30) Foreign Application Priority Data

Mar. 29, 2011  (FR) ..................... 11 00924

(51) Int. Cl.
*F03B 13/18* (2006.01)
*F03B 15/00* (2006.01)
*F03B 13/20* (2006.01)

(52) U.S. Cl.
CPC ................ *F03B 15/00* (2013.01); *F03B 13/20* (2013.01); *Y02E 10/38* (2013.01)

(58) Field of Classification Search
USPC ............................................ 290/53
See application file for complete search history.

(56) References Cited

U.S. PATENT DOCUMENTS

| | | | | |
|---|---|---|---|---|
| 4,110,630 | A * | 8/1978 | Hendel | 290/53 |
| 4,134,023 | A | 1/1979 | Salter | |
| 4,781,023 | A | 11/1988 | Gordon | |
| 7,768,144 | B2 * | 8/2010 | North et al. | 290/53 |
| 7,989,975 | B2 | 8/2011 | Clement et al. | |
| 8,269,365 | B2 | 9/2012 | Clement et al. | |
| 8,686,582 | B2 * | 4/2014 | Gardiner et al. | 290/53 |
| 8,766,470 | B2 * | 7/2014 | Beane | 290/53 |
| 8,915,078 | B2 * | 12/2014 | Beane | 60/505 |
| 2003/0001392 | A1 * | 1/2003 | Gerber et al. | 290/42 |
| 2007/0137195 | A1 * | 6/2007 | Tayla et al. | 60/497 |
| 2010/0320759 | A1 * | 12/2010 | Lightfoot et al. | 290/42 |
| 2011/0042949 | A1 * | 2/2011 | Laz et al. | 290/42 |

FOREIGN PATENT DOCUMENTS

FR      2 876 751 A1    4/2006
FR      2925129 A1 *    6/2009
(Continued)

*Primary Examiner* — Joseph Waks
(74) *Attorney, Agent, or Firm* — Fitch, Even, Tabin & Flannery, LLP

(57) ABSTRACT

The invention converts wave energy into electrical energy. A device moved by wave action is coupled to an electric machine for generating electrical power and to drive the device to improve conversion of wave action into electrical power. The conversion of the wave energy is improved through real-time estimation of forces exerted by waves on a pendulum axis to estimate the force to be applied to the device by the electric machine acting as an electrical motor.

19 Claims, 5 Drawing Sheets

(56) References Cited

FOREIGN PATENT DOCUMENTS

| GB | 2 434 408 A | 7/2007 |
| GB | 2 473 659 A | 3/2011 |
| WO | WO 2006040341 A1 * | 4/2006 |
| WO | WO 2009/081042 A1 | 7/2009 |

* cited by examiner (Prior Art)

METHOD OF CONTROLLING A DEVICE FOR CONVERTING WAVE ENERGY TO ELECTRICAL ENERGY

CROSS REFERENCE TO RELATED APPLICATION

Reference is made to French Application Serial No. 11/00.924, filed Mar. 29, 2011, which application is incorporated herein by reference in its entirety.

BACKGROUND OF THE INVENTION

1. Field of the Invention

The invention relates to conversion of wave energy into electrical energy and particularly to "wave energy converters", which produce electricity from a renewable energy source (the potential and kinetic wave energy) for isolated island sites.

2. Description of the Prior Art

French Patent 2,876,751 and WO-2009/081,042 describe devices which capture the energy produced by sea water forces. These devices use a floating support containing a pendulum movably mounted in the floating support with the relative motion of the pendulum in relation to the floating support being used to produce electricity.

SUMMARY OF THE INVENTION

The invention improves wave energy converting devices through real-time estimation of the forces exerted by waves on the pendulum axis so as to provide the best strategic adjustments for electrical energy recovery.

In general terms, the invention describes a method for converting wave energy into electrical energy using a device comprising a moving element, cooperating with an electrical motor, which oscillates with respect to the motor under the action of the waves. According to the invention, the following stages are carried out:

a) selecting a law or relationship that expresses the position of the moving element according to the force exerted by the motor on the moving element and according to the wave force applied onto the moving element;

b) actuating the motor in order to produce a given force on the moving element;

c) measuring the position of the moving element with respect to the motor over time;

d) determining the wave force using the law or relationship selected in a) and by accounting for the force of the motor given in b) and of the position of the moving element in c);

e) determining a new value for the force exerted by the motor on the moving element, the new value corresponding to a force that maximizes the average electrical power generated by the motor, the average electrical power depending on the wave force determined in d), on the new value of the force exerted by the motor on the moving element and on a position of the moving element with respect to the motor; and f) actuating the motor in order to produce the new force value determined in e) by supplying electrical energy to the motor when the force of the motor drives the moving device and by generating electrical energy by the motor when the force of the motor resists the motion of the moving element.

According to the invention, the law or relationship selected in a) can express the equality between the sum of the forces applied to the moving element and the product of the mass of the moving element and the acceleration of the moving element.

According to the invention:

a first model expressing the force exerted by the motor on the moving element as a function of time can be selected;

a second model expressing the wave force applied to the moving element as a function of time can be selected;

in b), values can be set for the parameters of the first model and the motor can be actuated in order to produce a force given by the first model with the set parameter values;

in d), the parameters of the second model can be determined;

in e), the parameters of the first model can be determined;

in f), the motor can be actuated in order to produce a force given by the first model with the parameters determined in e).

The second model can be a sum of sinusoidal functions.

In stage a), the following law or relationship can be selected:

$$J\ddot{x} + \mu\dot{x} + kx = \sum_{i=1}^{P} D_i \sin(\omega_i t + \varphi_i) + C$$

The first model can be selected:

$$C = K_x x + K_v \dot{x}$$

$$\sum_{i=1}^{P} D_i \sin(\omega_i t + \varphi_i)$$

The second model can be selected:

wherein:

x is the position of the moving element with respect to the motor;

J is the inertia of the moving element;

k is the restoring force due to the earth's gravity;

μ is a term modelling the viscous frictions of the moving element;

C is the force exerted by the motor on the moving element;

Kx and Kv are parameters; P is an integer; and

Di is an amplitude, ωi is a frequency and φ is a phase.

Before a), term values J, k and μ can be determined.

In a), number P can be selected ranging between 10 and 100, and frequencies ωi can be selected ranging between 0 and 2 Hz.

In e), the new value of the motor force allowing the average electrical power generated by the motor to be maximized can be determined for a frequency ωi to which the greatest amplitude Di corresponds.

In e), the new value of the motor force allowing the average electrical power generated by the motor to be maximized can be determined for all the frequencies ωi.

After stage f), stages c, d, e and f can be repeated.

In stage b), the given force can be selected by the user.

Stage c) can be carried out for at least 30 seconds.

BRIEF DESCRIPTION OF THE DRAWINGS

Other features and advantages of the invention will be clear from reading the description hereafter, with reference to the accompanying figures wherein.

DETAILED DESCRIPTION OF THE INVENTION

Figure 1:
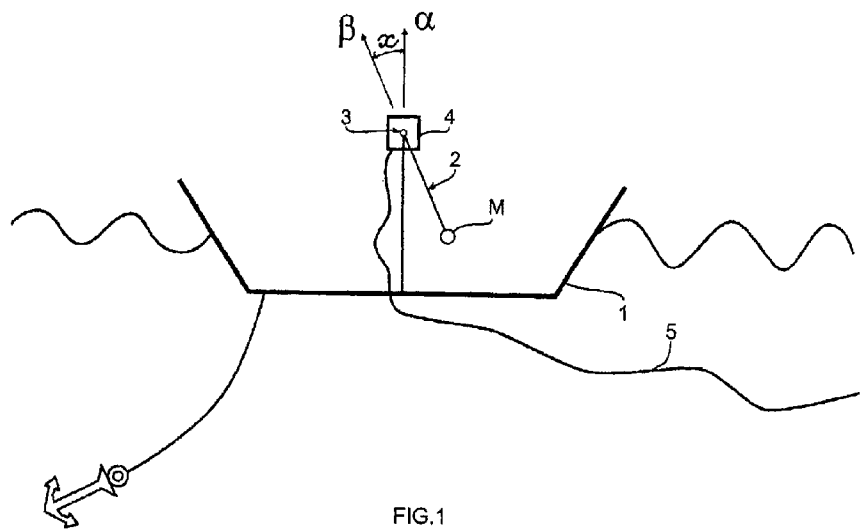
FIGS. 1 and 2 show prior art systems that convert wave energy into electricity that can be used with the practice of the invention.
Figure 2:
Figure 2:
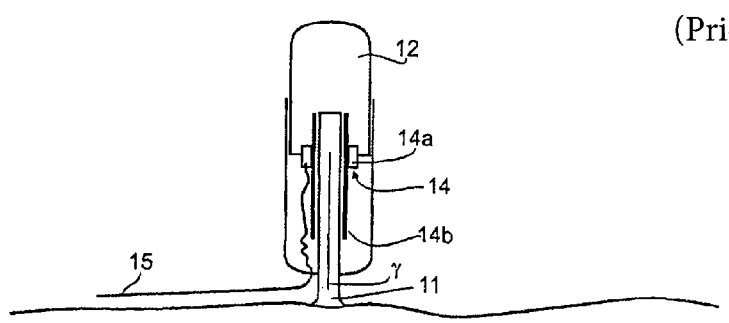

A "wave energy converter" system used with the practice of the present invention comprises a moving element that actuates an electrical machine as illustrated in FIGS. 1 and 2. The waves set the moving element into motion with respect to the electrical machine. The electric machine operates alternately in electrical power generating mode for wave energy recovery and in motor mode for actuation of the motor to move the moving element.

A first embodiment of a system used with the practice of the invention is shown in FIG. 1. The wave energy converter for conversion of the wave energy into electrical energy includes a floating element 1 on which a moving element which is a pendulum 2 is disposed. The floating element floats on the sea. Pendulum 2 is mounted to rotate around a fixed axis 3 with respect to floating element 1. In FIG. 1, pendulum 2 is a rod provided, which at one end thereof has a mass M. The rod is the lever arm of mass M rotating around axis 3. The pendulum's motions actuate a shaft on axis 3. Alternatively, pendulum 2 can be a wheel rotating on axis 3 whose center of gravity is displaced from axis 3.

The wave energy converter comprises an energy recovery device 4 that recovers energy from the shaft of axis 3. Device 4 is an electrical machine which generates electricity. The electrical machine also uses a motor for actuating the pendulum. The shaft of electrical machine 4 can be directly connected to the shaft actuated by the pendulum. Electrical machine 4 can also be connected to the pendulum through a motion transmission system with rotating speed reduction, such as a gear set for example.

Electricity export and electrical supply to the electrical machine 4 is achieved through a cable 5 connecting float 1 to the onshore grid.

During operation of the wave energy converter, floating element 1 is set into motion through the action of the waves while the pendulum tends to remain in a vertical position due to mass M. Seen from floating element 1, pendulum 2 is set into motion with respect to floating element 1 under the action of the waves on floating element 1. The rotating motions of pendulum 2 actuate the shaft of axis 3 that drives electrical generator 4.

The motion of pendulum 2 can be determined by its angular position x with respect to floating element 1. Angle x can be measured between a direction α related to the floating element and direction β of the rod of pendulum 2. Direction α can correspond to the direction of the rod of pendulum 2 when pendulum 2 is at rest and floating element 1 is at equilibrium on a calm sea.

A second embodiment of a system used with the practice of the invention is shown in FIG. 2. The wave energy converter for conversion of the wave energy into electrical energy includes a rod 11 anchored to the seabed and of a moving element made up of a float 12, which is mobile in translation on rod 11.

The wave energy converter comprises an energy recovery device 14 that recovers the energy produced by the motions of float 12. Machine 14 is a linear motor that can operate alternatively as an electrical generator and as a motor for actuating float 12 with respect to rod 11. Motor 14 is made up of one or more pads 14a, a coil for example, and of ramp 14b including, for example, a succession of magnets arranged along rod 11.

Electrical power export and electrical power supply to electric machine 14 is achieved through a cable 15 connecting float 12 to the onshore grid.

During operation of the wave energy converter, floating element 12 is set into motion by the action of the waves while rod 11, anchored to the seabed, remains stationary. Float 12 successively and alternately carries out ascending and descending motions along rod 11. The translational motion of float 12 drives electrical machine 14a with respect to 14b to produce electricity.

The motion of float 12 can be determined by its position x that can be measured, which for example, is the distance of pad 14a from a fixed reference position γ on rod 11.

According to the method of the invention, a law or relationship expressing the position of the moving element as a function of the force exerted by the motor on the moving element and as a function of the wave force applied onto the moving element is selected. According to the law or relationship of equilibrium of the moving element in oscillating motion, for example pendulum 2 at axis of rotation 3 or float 12 at rod 11, the sum of the external forces applied to the moving element is equal to the product of the mass of the moving element and the acceleration at the center of inertia thereof. In this instance, the forces applied to the moving element are the force or torque applied by the motor to the moving element, the action of the waves on the moving element, the frictions undergone by the moving element and the earth's gravity force. The law or relationship of equilibrium of the moving element in motion can be modelled by the equation as follows:

$$J\ddot{x} + \mu\dot{x} + kx = \sum_{i=1}^{P} D_i \sin(\omega_i t + \varphi_i) + C \tag{1}$$

where x represents the position of the moving element (angle or distance with respect to a reference), $\dot{x}$ represents the first derivative of function x with respect to time (i.e. the velocity of the moving element), and $\ddot{x}$ represents the second derivative of function x with respect to time (i.e. the acceleration of the moving element), J represents the inertia of the moving element, for example of pendulum 2 with respect to axis 3 or float 12 with respect to rod 11, k is the restoring force, due to the earth's gravity, to an equilibrium position due to mass M of pendulum 2 or to mass M of float 12, μ is a term modelling the viscous frictions of pendulum 2 or float 12, C is the torque supplied by motor 4 or the force supplied by motor 14, which can be controlled.

$$\sum_{i=1}^{P} D_i \sin(\omega_i t + \varphi_i)$$

corresponds to the model that represents the force created by the waves on the moving element with respect to the axis of motor 4 or rod 11. It is assumed that it is a sum of P oscillating terms with each term i being characterized by an amplitude Di, a frequency ωi and a phase φi. Other models can be used in the method according to the invention. The model corresponding to a sum of sinusoidal functions (i.e. a model of the form $$\sum_{i=1}^{P} D_i \sin(\omega_i t + \varphi_i))$$

allows the spectral content of the forces created by the waves to be used for optimizing the electrical energy which is recovered.

Equation (1) can be written in a different but equivalent form that is easier to utilize. For each pulse ωi, the vector as follows is denoted by zi:

$$z_i = \begin{pmatrix} z_{i,1} \\ z_{i,2} \end{pmatrix} \begin{pmatrix} D_i \sin(\omega_i t + \varphi_i) \\ D_i \omega_i \cos(\omega_i t + \varphi_i) \end{pmatrix}$$

If the derivative of vector zi is calculated with respect to time, it can be shown that:

$$\dot{z}_i = \underbrace{\begin{pmatrix} 0 & 1 \\ -\omega_i^2 & 0 \end{pmatrix}}_{\Omega_i} z_i$$

and the 2×2 matrix that appears in the previous equation is denoted by $\Omega_i$. If all the vectors zi are assembled into a vector of dimension 2×P denoted by z, the derivative of this vector z is obtained with respect to time meets the equation as follows:

$$\dot{z} = \underbrace{\begin{pmatrix} Q_1 & 0 & \cdots & 0 \\ 0 & \ddots & \ddots & \vdots \\ \vdots & \ddots & Q_{P-1} & 0 \\ 0 & \cdots & 0 & Q_P \end{pmatrix}}_{\Omega} z$$

where matrix Ω involved in this equation is a block diagonal matrix whose diagonal blocks are matrices Qi. In the end, the sum for i ranging from 1 to P in Equation (1) is equal to the sum for i ranging from 1 to P of the first component of vector z, which describes a differential representation given by the previous equation. More precisely, the following relationship is obtained:

$$\sum_{i=1}^{P} D_i \sin(\omega_i t + \varphi_i) = \underbrace{(1 \;\; 0 \;\; \cdots \;\; \cdots \;\; 1 \;\; 0)}_{\Sigma} z$$

Finally, the vector x, ẋ and z is denoted by X. The state space representation of Equation (1) is as follows:

$$\dot{X} = \underbrace{\begin{pmatrix} 0 & 1 & 0 \\ -k/J & -\mu/J & \Sigma \\ 0 & 0 & \Omega \end{pmatrix}}_{A} X + \underbrace{\begin{pmatrix} 0 \\ 1/J \\ 0 \end{pmatrix}}_{B} C \quad (1')$$

Figure 3:
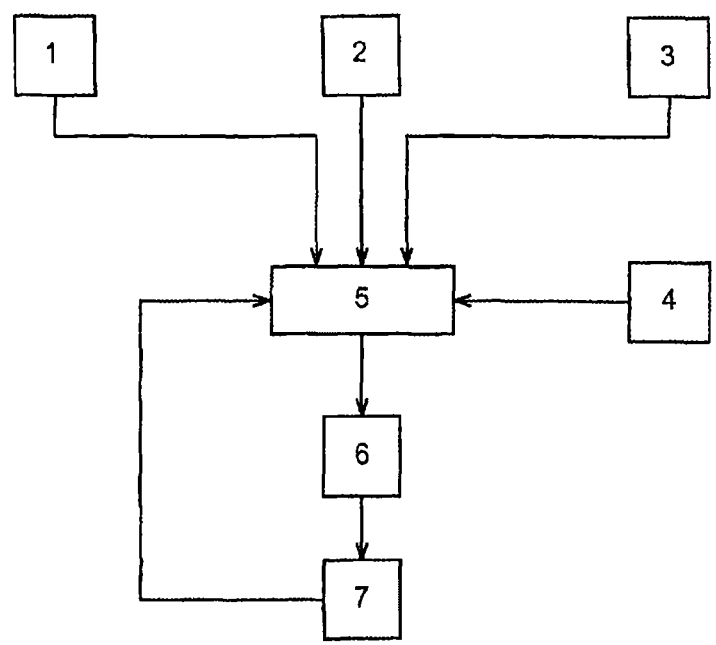
FIG. 3 shows an example of a process diagram of the method for controlling a wave energy converter according to the invention.

According to the invention, the control method described hereafter in connection with FIG. 3 is implemented.

According to the invention, the spectrum of the torque exerted by the waves on axis 3 of pendulum 2 or of the force exerted by the wave on float 12 is estimated in real time. That is, the P amplitude values Di and phase values φi of Equation (1) are determined by carrying out the following operations.

Operation 1

Terms J, k and μ depend on the physical constitution and they are intrinsic parameters of the wave energy converter.

Terms J, k and μ allowing the oscillating motion of the moving element to be modelled are determined.

Terms J, k and μ can be determined theoretically or by experimentation. For example, terms J, k and μ can be determined through calculation by taking the physical constitution of the wave energy converter into account. Alternatively, the wave energy converter is subjected to waveless conditions and without motor actuation, the moving element is shifted with respect to its equilibrium position and the position is measured over time. Values J, k and μ are determined using equation Jẍ+μẋ+kx=0 that expresses the equilibrium of the moving element.

Operation 2

A value for P and the values of frequencies ωi is selected. Integer P can be selected between 10 and 100. It has been observed that, for modelling the forces created by the waves, the values of ωi can be selected in low frequencies, for example in the 0-2 Hz range, preferably between 0 and 0.5 Hz. The values of ωi can be evenly distributed over the selected range.

For example, if P=20 is selected, the values 20 of ωi are selected in the 0-0.5 Hz range. In this case, $$\omega i = i \times \frac{0.5}{20}$$

by varying i within the range of integers from 0 to 20.

If P=80 is selected, the values 80 of ωi are selected in the 0-2 Hz range, and $$\omega i = i \times \frac{2}{80}$$

by varying i within the range of integers from 0 to 80.

Operation 3

Operation 3 corresponds to stage b) of the method according to the invention. The motor is actuated to produce a given known force on the moving element.

The electrical motor is actuated in order to impose a torque or a force on the moving element, for example a torque on pendulum 2 or a force on float 12. The torque or force C can be described by the model as follows:

$$C = K_x x + K_v \dot{x} \quad (2)$$

wherein Kx and Kv are parameters. Considering that C is a function depending on the position and the velocity of the oscillating moving element, the torque applied by the motor is also oscillating. By applying torque C in Equation (1) (or in Equation (1')), the natural frequency and the natural damping of the assembly made up of moving element 2 or 12 and electric machine 4 or 14 can be modified.

Initially, a zero force or torque C can be selected (Kx=0 and Kv=0).

If x and ẋ are oscillating, force or torque C also has an oscillating character.

It is also possible to determine initial values for Kx and Kv from a theoretical knowledge of the wave by implementing operation 6 described below.

Operation 4

Operation 4 corresponds to stage c) of the method according to the invention. The position x of the moving element is measured in real time using sensors. Measurement of the position can be conducted for a minimum period of time, for example at least 1 minute, preferably at least 30 seconds.

The sensor can be an incremental optical sensor including a light source of a sensor detecting a luminous flux and of a perforated wheel in the case of the device of FIG. 1, or of a perforated or engraved rule in the case of the device of FIG. 2.

Operation 5

Operation 5 corresponds to stage d) of the method according to the invention. The force created by the waves on the moving element is determined. In particular, the force created by the waves on the moving element can be determined by determining the P amplitude values Di and phase values ωi of Equation (1) using:

terms J, k and μ determined in operation 1,
a value of P and the values of ωi selected in operation 2,
the value of torque or force C applied by motor 4 or 14 in operation 3, and
angle x measured in operation 4.

This operation 5 is carried out using an observer that is compatible with real-time operation. The observer is akin to a filter bank acting upon the measured position in order to extract the phases and the amplitudes of the excitation generated by the waves.

In practice, the vector containing the estimations of the position, the velocity and the sinusoidal components zi previously introduced to obtain Equation (1') is denoted by $\hat{X}$. Calculation of these estimations requires the following calculations:

$$\frac{d\hat{X}}{dt} = A\hat{X} + BC - K(\hat{x} - x),$$

wherein $\hat{x}$ is the first component of vector $\hat{X}$, and x is the position measurement.

The previous calculations are constructed from parameters (J, k, μ) and from the P values of ωi. To calculate $\hat{X}$, it is also necessary to inject into the calculation's position measurement x, as well as the exerted torque or force C.

It is possible to solve the previous equation on line, which allows obtaining the vector $\hat{X}$ that contains all the necessary information. It is possible to extract the phase φi and amplitude Di information from vector $\hat{X}$ with:

$$Di = F_D(i, \hat{X}) = \sqrt{\hat{z}_{i,1}^2 + (z_{i,2}/\omega_i)^2}$$

$$\varphi i = F_\varphi(i, \hat{X}) = a\tan(\omega_i \hat{z}_{i,1}/\hat{z}_{i,2})$$

where functions $F_D$ and $F_\varphi$ carry out elementary operations (additions, multiplications and trigonometric functions) from some components of $\hat{X}$. By the construction of function F, the exact amplitude and phase values are obtained.

This phase is very different from other known methods. Indeed, it is desired to estimate the frequency content of the excitation due to the swell. The known methods predict the excitation of the swell over a future time horizon, whereas our method of the invention is solely based on already acquired measurements in order to describe the swell as a sum of sinusoidal functions and thus to find the spectral content of the forces created by the swell.

Figure 4:
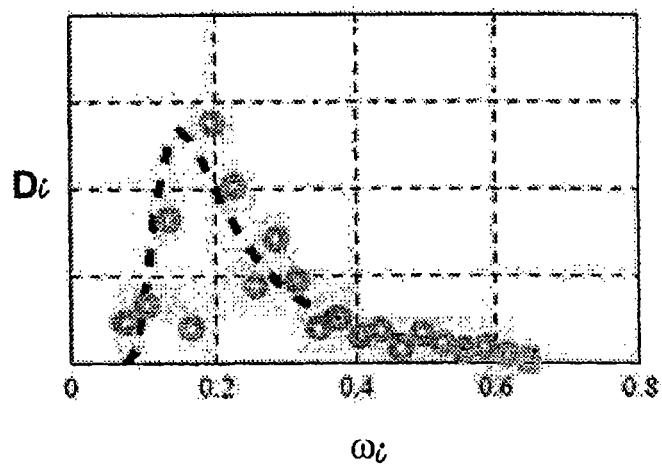
FIGS. 4 to 6 show the evolution of the estimation of the forces exerted by the waves.
Figure 5:
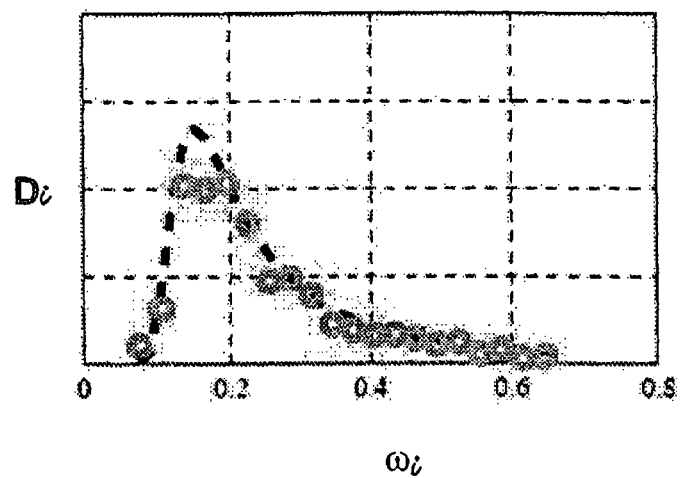
Figure 6:
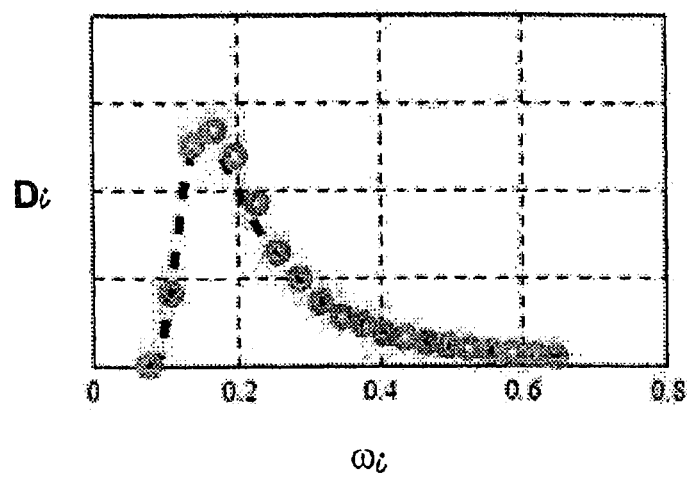

The evolution of the reconstructed spectrum can be traced over time. In fact, as shown by the equation used for calculating $\hat{X}$, $\hat{X}$ is obtained by solving a differential equation, and there is therefore certain dynamics in the estimation of the amplitudes and phases. In practice, this takes some time, which can be selected for the estimated phase and amplitude values to converge exactly to the values related to the swell. FIGS. 4, 5 and 6 show amplitude Di as a function of frequency ωi at the times t1, t2>t1 and t3>t2 respectively. Observing FIG. 4 at t1, FIG. 5 at t2 and FIG. 6 at t3 shows that the estimated amplitudes Di, represented by circles, converge to the exact values, shown in dotted line, over time.

Operation 6

Operation 6 corresponds to e) of the method according to the invention. A new value is determined for the force exerted by the motor on the moving element. The new value allows the average electrical power recovered by the motor to be maximized.

According to the invention, the estimation of the wave force spectrum is used to drive the wave energy converter by modifying the action of electrical machine 4 or 14 so that the oscillation of pendulum 2 or of float 12 is in tune with the waves.

Knowing at this time the frequencies contained in the swell, as well as the energy level of each one, a new value can be calculated for torque or force C, that is, new values for Kx and Kv. The new value of torque or force C is determined to modify the natural frequency and the natural damping of the assembly made up of moving element 2 or 12 and electric machine 4 or 14 as a function of the spectrum of the swell (that is, the phase and amplitude values ωi and Di), determined in operation 5, in order to maximize the average electric power recovered by the motor.

Method 1 determines the peak frequency Ω of the swell. Resonant frequency Ω corresponds to the value of ωi associated with the highest amplitude value Di. New values are determined for parameters Kx and Kv while disregarding the other frequency components and by trying to maximize the average power recovered at frequency Ω. For the particular example of Equation (1), this results in practice to selecting Kv=−μ and Kx=k−JΩ.

Method 2 takes into account all the frequencies contained in the spectrum provided by operation 5. Parameters Kx and Kv are determined for the average power recovered to be maximal by taking all the frequencies ωi into account. In practice, the average electrical power is calculated using the equation below, which is the mean of the instantaneous electrical power over a time period T. The value of T tends to infinity with the instantaneous electrical power being given by the product of torque or force C by the motor speed (that is the rotating speed or linear speed of the motor) as follows:

$$P_{elec} = \lim_{T \to \infty} \frac{1}{T}\int_0^T -C(t)\dot{x}(t)\,dt = \lim_{T \to \infty} \frac{1}{T}\int_0^T -(K_x x + K_v \dot{x})\dot{x}(t)\,dt.$$

Figure 7:
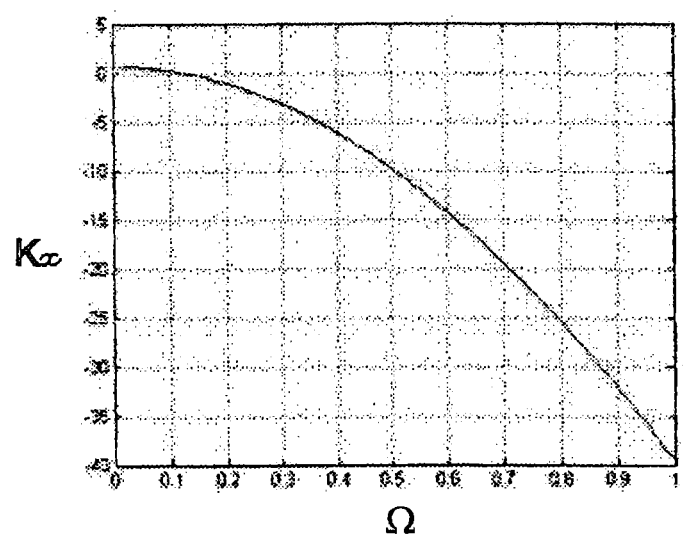
FIGS. 7 and 8 show the motor control parameters determined with the method according to the invention.
Figure 8:
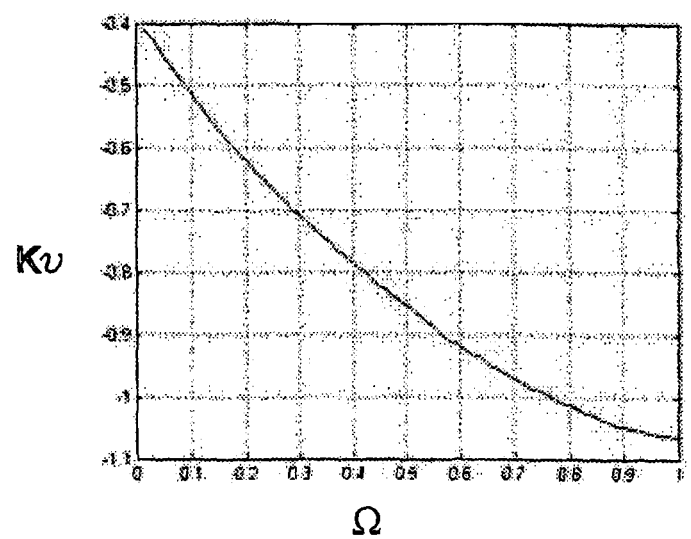

This equation clearly shows that the recovered average electrical power is a function of parameters Kx and Kv, and of parameters Di and ωi since velocity ẋ, whose evolution is given by (1), obviously depends on the excitation of the swell. Finally, it is desired to find the optimum parameters allowing to maximizing the recovered electrical power by a numerical calculation, such as, for example, the optimization problem as follows:

$$\max_{(Kx, Kv)} (P_{elec}(Kx, Kv, Di, \omega i, J, k, \mu))$$

where $P_{elec}$ is the average electrical power produced from the waves and its frequency components in $\omega i$. Thus, for the example of FIG. 1, Kx and Kv are obtained by reading the tables shown in FIGS. 7 and 8, where Kx and Kv are given as a function of $\Omega$ but obtained by taking account of the whole spectrum of the forces created by the waves.

Operation 7

Operation 7 corresponds to f) of the method according to the invention. The motor is actuated to reproduce the new value of the force as determined in Operation 6.

The new expression for torque or force C of motor 4 or 14 is determined with parameters Kx and Kv determined in operation 6. Although parameters Kx and Kv are kept constant until the next iteration of the procedure, torque or force C depends on the position and on the velocity of the moving element and therefore its value evolves in an oscillating manner over time.

The new expression of torque or force C is applied to motor 4 or 14. The motor is controlled for application of a torque or force C to the moving element by modifying the voltage applied to the motor. More precisely, in order to provide a torque or force C that drives the moving element, a voltage is applied by providing electrical power. On the other hand, to produce a torque or force C that resists the motion of the moving element, a voltage is applied by recovering an electrical power.

Throughout the phase of operation of the wave energy converter, the sea state is highly likely to change (variation of the swell peak period, spectrum deformation, etc.). Furthermore, the wave energy converter itself can be sensitive to aging and its behavior with respect to the stress due to the waves can vary over time.

According to the invention, in order to take these variations into account, operations 4 to 7 can be repeated.

For example, operations 4 and 5 are carried out continuously. As soon as a value of Di varies beyond a threshold in relation to the first values of Di that have been determined, for example as soon as a value Di varies by more than 5%, operations 6 and 7 are performed.

Alternatively, operations 4 and 5 are carried out at regular intervals for a predetermined time period, for example once a day, or every week, for 1 hour. Operations 6 and 7 are then performed.

The invention claimed is:

1. A method of converting wave energy into electrical energy using a device including a moving element oscillating with respect to an electrical machine in response to waves comprising:
    a) selecting a relationship expressing a position of the moving element as a function of a force exerted by the machine on the moving element as a function of wave force applied to the moving element;
    b) actuating the machine to produce a given force on the moving element;
    c) measuring a position of the moving element with respect to the machine over time;
    d) determining a wave force using the relationship which accounts for the given force of the machine and the measured position of the moving element;
    e) determining a new value of force exerted by the machine on the moving element corresponding to a force for maximizing an average electrical power generated by the machine, which depends on the wave force on a new value of the force exerted by the machine on the moving element and on a position of the moving element with respect to the machine; and
    f) actuating the machine to produce the new value of force by supplying electrical energy to the machine when the force provided by the machine drives the moving element and for recovering electrical energy from the machine when the force provided by the machine resists motion of the moving element.

2. A method as claimed in claim 1, wherein the relationship expresses an equality between a sum of forces applied to the moving element and a product of a mass of the moving element and an acceleration of the moving element.

3. A method as claimed in claim 1, comprising:
    selecting a first model expressing force exerted by the machine on the moving element as a function of time;
    selecting a second model expressing wave force applied to the moving element as a function of time;
    in b), setting values for parameters of the first model while the machine is actuated to produce a force given by the first model with the set parameter values;
    in d), determining the parameters of the second model;
    in e), determining parameters of the first model; and
    in f), actuating the machine to produce a force determined by the first model with the parameters determined in e).

4. A method as claimed in claim 3, wherein the second model comprises a sum of sinusoidal functions.

5. A method as claimed in claim 4 wherein,
    In a), selecting a relationship $$J\ddot{x} + \mu\dot{x} + kx = \sum_{i=1}^{P} D_i \sin(\omega_i t + \varphi_i) + C$$

$C = K_x x + K_v \dot{x}$ for the first model;

$$\sum_{i=1}^{P} D_i \sin(\omega_i t + \varphi_i)$$

for the second model and
    wherein:
    x is position of the moving element with respect to the machine;
    J is the inertia of the moving element;
    k is the restoring force due to earth's gravity;
    $\mu$ is a term modelling viscous friction of the moving element;
    C is a force exerted by the motor on the moving element;
    Kx and Kv are parameters;
    P is an integer; and
    Di is an amplitude, $\omega i$ is a frequency and $\phi i$ is a phase.

6. A method as claimed in claim 5 wherein, in e), the new value of force allowing an average electrical power generated by the machine to be maximized is determined for a frequency $\omega i$ to which a greatest amplitude of Di corresponds.

7. A method as claimed in claim 5 wherein, in e), a new value of force allowing the average electrical power generated by the machine to be maximized is determined for all frequencies of $\omega i$.

8. A method as claimed in claim 5 wherein, in a), P ranges between 10 and 100 and frequencies $\omega i$ are selected ranging between 0 and 2 Hz.

9. A method as claimed in claim 8 wherein, in e), a new value of the force allowing the average electrical power generated by the machine to be maximized is determined for all frequencies of $\omega i$.

10. A method as claimed in claim 8 wherein, in e), the new value of force allowing an average electrical power generated by the motor to be maximized is determined for a frequency $\omega i$ to which a greatest amplitude of Di corresponds.

11. A method as claimed in claim 4 wherein, prior to a), values of J, k and $\mu$ are determined.

12. A method as claimed in claim 11 wherein, in e), the new value of force allowing an average electrical power generated by the machine to be maximized is determined for a frequency $\omega i$ to which a greatest amplitude of Di corresponds.

13. A method as claimed in claim 11 wherein, in e), a new value of force allowing the average electrical power generated by the machine to be maximized is determined for all frequencies of $\omega i$.

14. A method as claimed in claim 4 wherein, in a), P is selected ranging between 10 and 100, and frequencies $\omega i$ are selected ranging between 0 and 2 Hz.

15. A method as claimed in claim 14 wherein, in e), the new value of force allowing an average electrical power generated by the motor to be maximized is determined for a frequency $\omega i$ to which a greatest amplitude of Di corresponds.

16. A method as claimed in claim 14 wherein, in e), a new value of the force allowing the average electrical power generated by the machine to be maximized is determined for all frequencies of $\omega i$.

17. A method as claimed in claim 1 wherein after f), c), d), e) and f) are repeated.

18. A method as claimed in claim 1 wherein, in b), the given force is selected by a user.

19. A method as claimed in claim 1, wherein c) is carried out for at least 30 seconds.

* * * * *